United States Patent [19]

Nutter

[11] Patent Number: 5,360,583
[45] Date of Patent: Nov. 1, 1994

[54] HIGH CAPACITY TRAY FOR GAS-LIQUID CONTACT APPARATUS

[76] Inventor: Dale E. Nutter, P.O. Box 700480, Tulsa, Okla. 74170

[21] Appl. No.: 77,613

[22] Filed: Jun. 17, 1993

[51] Int. Cl.$^5$ .............................................. B01F 3/04
[52] U.S. Cl. ................................ 261/114.3; 261/114.4
[58] Field of Search ............................ 261/114.3, 114.4

[56] References Cited

U.S. PATENT DOCUMENTS

| | | | |
|---|---|---|---|
| 3,463,464 | 8/1969 | Nutter et al. | 261/114.1 |
| 3,747,905 | 7/1973 | Nutter | 261/114.3 |
| 3,770,255 | 11/1973 | Nutter | 261/114.4 |
| 5,147,584 | 9/1992 | Binkley et al. | 261/114.3 |

FOREIGN PATENT DOCUMENTS 690798  4/1953  United Kingdom ............. 261/114.3

*Primary Examiner*—Tim Miles
*Attorney, Agent, or Firm*—Beveridge, DeGrandi, Weilacher & Young

[57] ABSTRACT

In a crossflow gas-liquid contact tower, liquid moves horizontally across a plurality of vertically spaced trays, and downwardly from tray-to-tray while gas flows up through openings in the trays to create a liquid-vapor mixture in an active bubble area. Each opening includes an aperture in the plane of the tray, and a deflector which overlies the aperture to define lateral vapor outlet slots. The aperture is wider at its upstream end than at its downstream end; and, the deflector has upstream and downstream portions which extend across the ends of the aperture. The deflectors can be stationary or they can be vertically movable valves. The centers of the apertures are spaced apart no more than about 3.0 inches in the longitudinal flow direction, and no more than about 2.0 inches transversely of the flow direction. The apertures have lengths no greater than 2.0 inches, upstream widths no greater than about 1.0 inch, and downstream widths no greater than 0.75 inch. The lateral outlet slots have upper edges no longer than about 0.85 inch, lower edges no longer than about 2.0 inches, and heights no greater than 0.35 inch. The trays are manufactured by a pressing technique causing burrs to be formed around the lateral outlet slots.

13 Claims, 3 Drawing Sheets

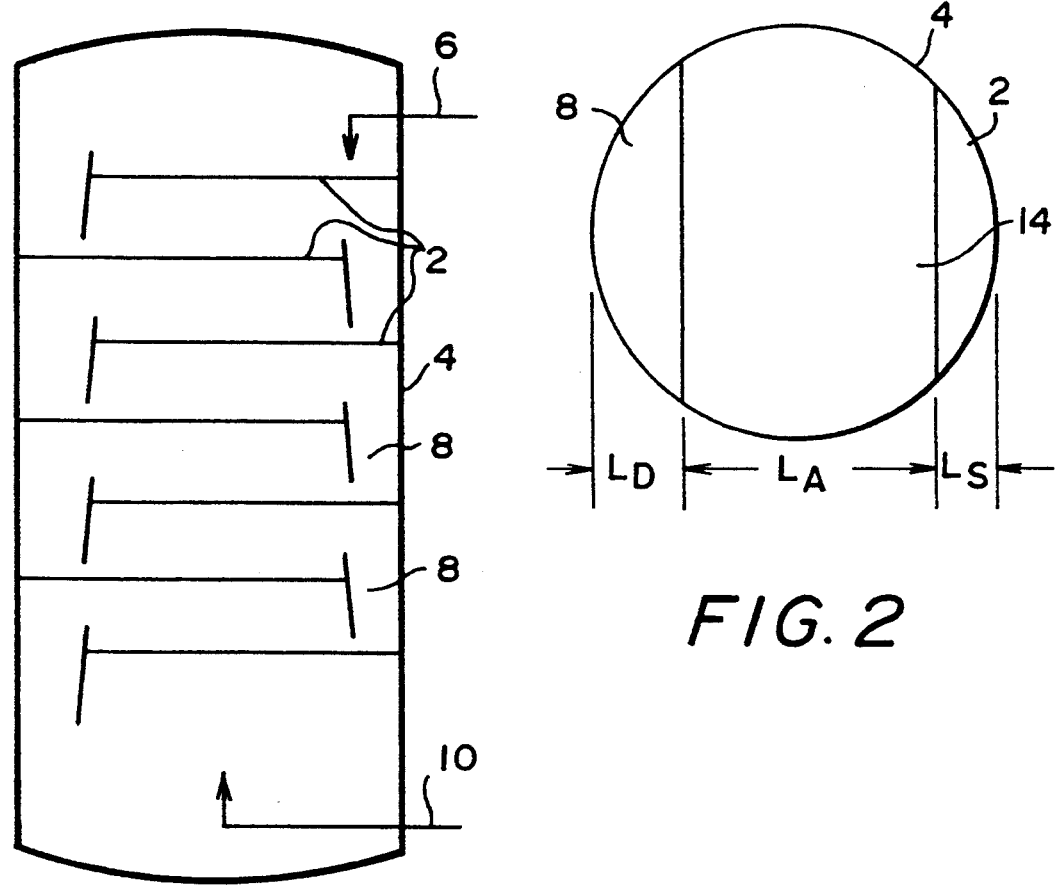
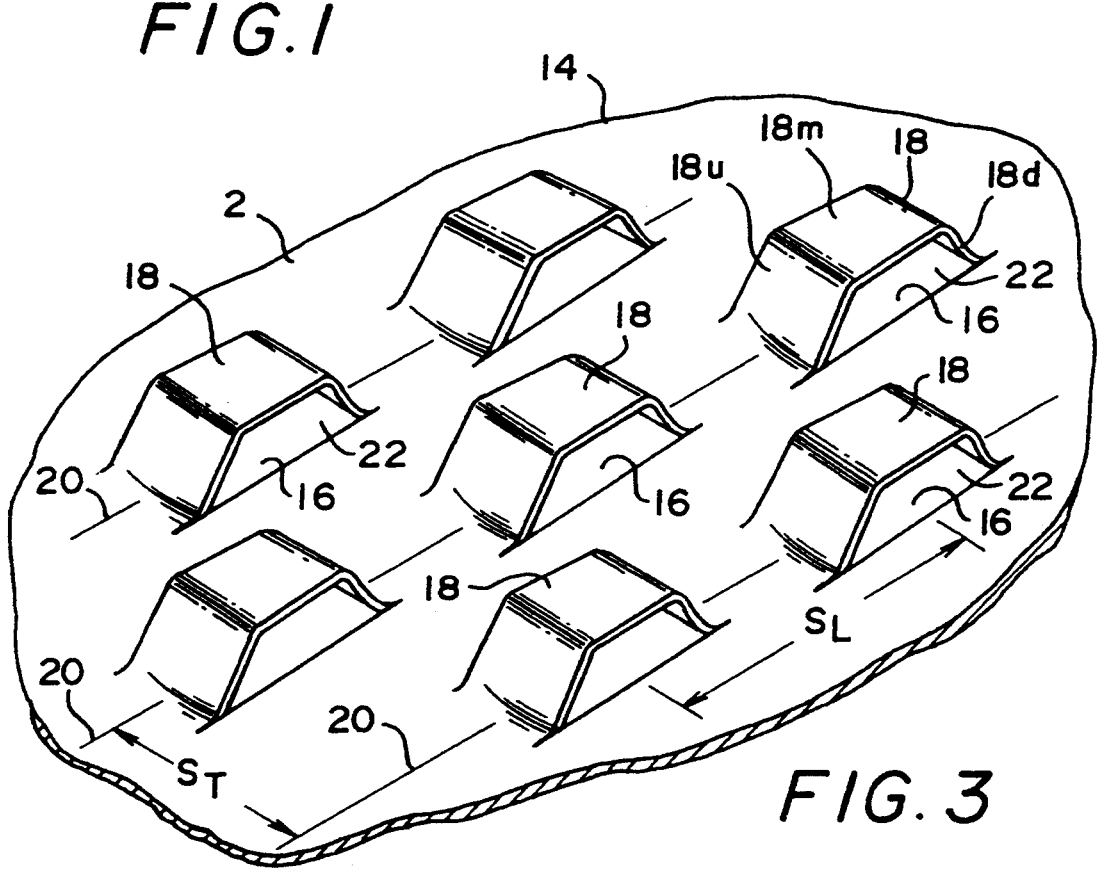
FIG. 1
FIG. 2
FIG. 3

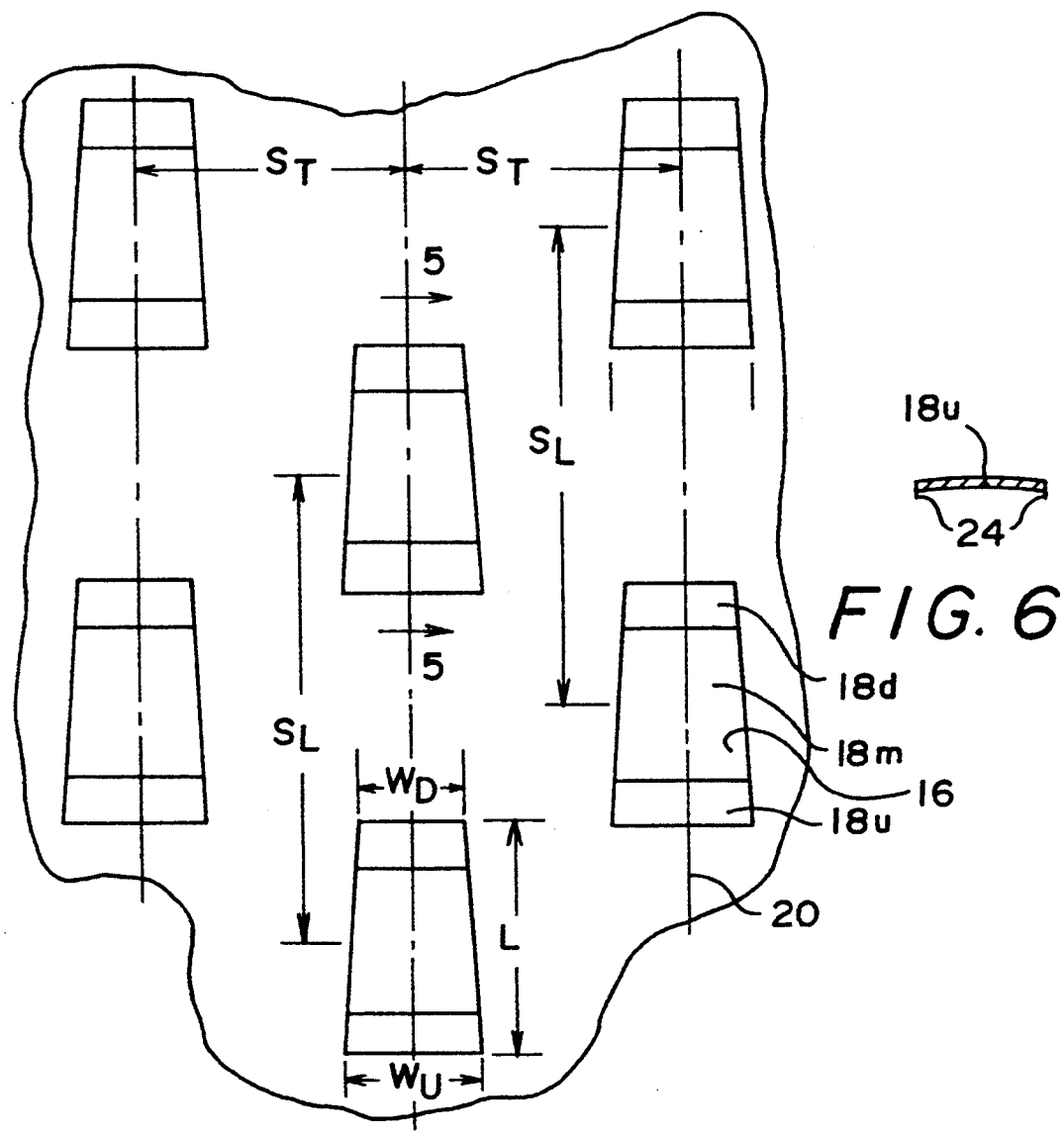
FIG. 4
FIG. 6
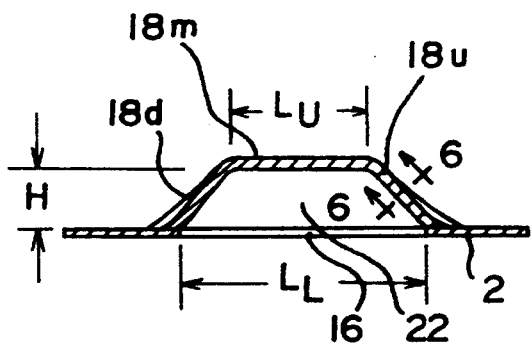
FIG. 5
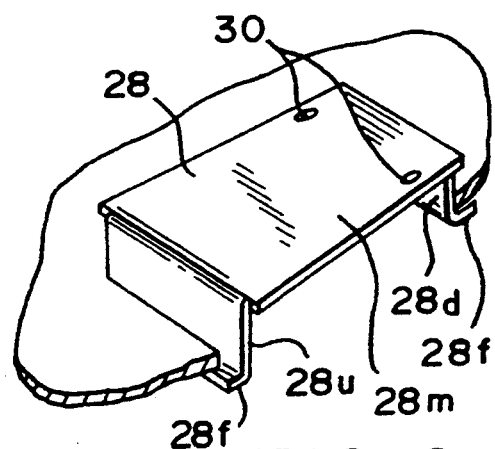
FIG. 9

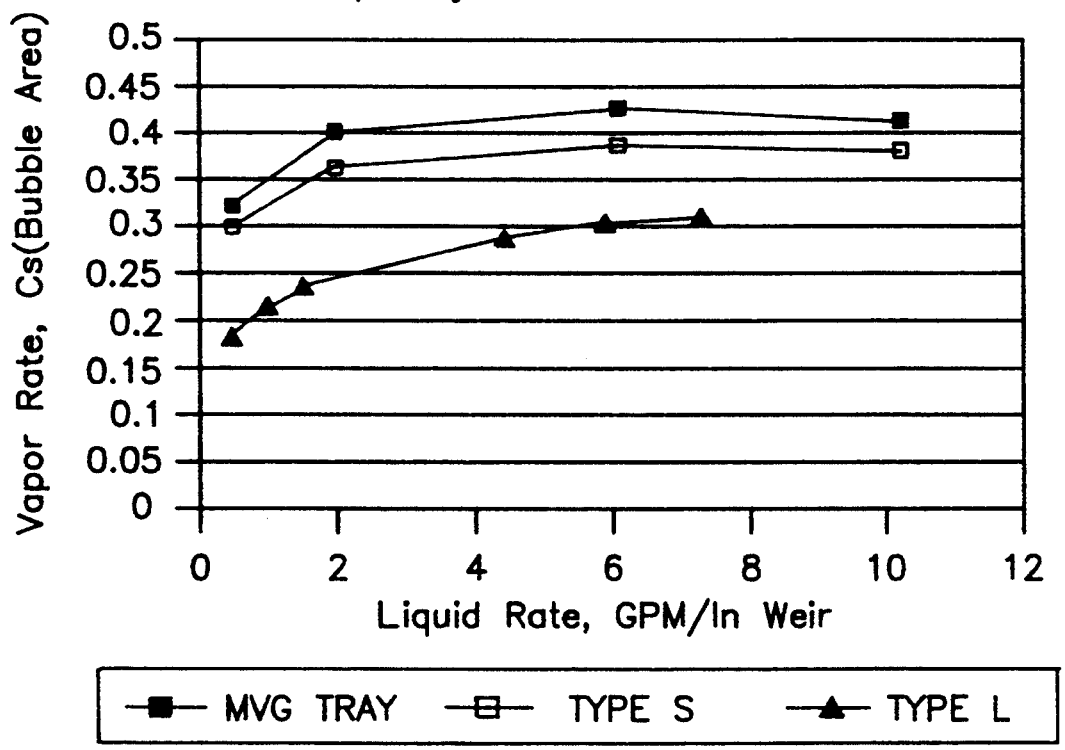
FIG. 7 Tray Comparison Capacity @ 10% Entrainment
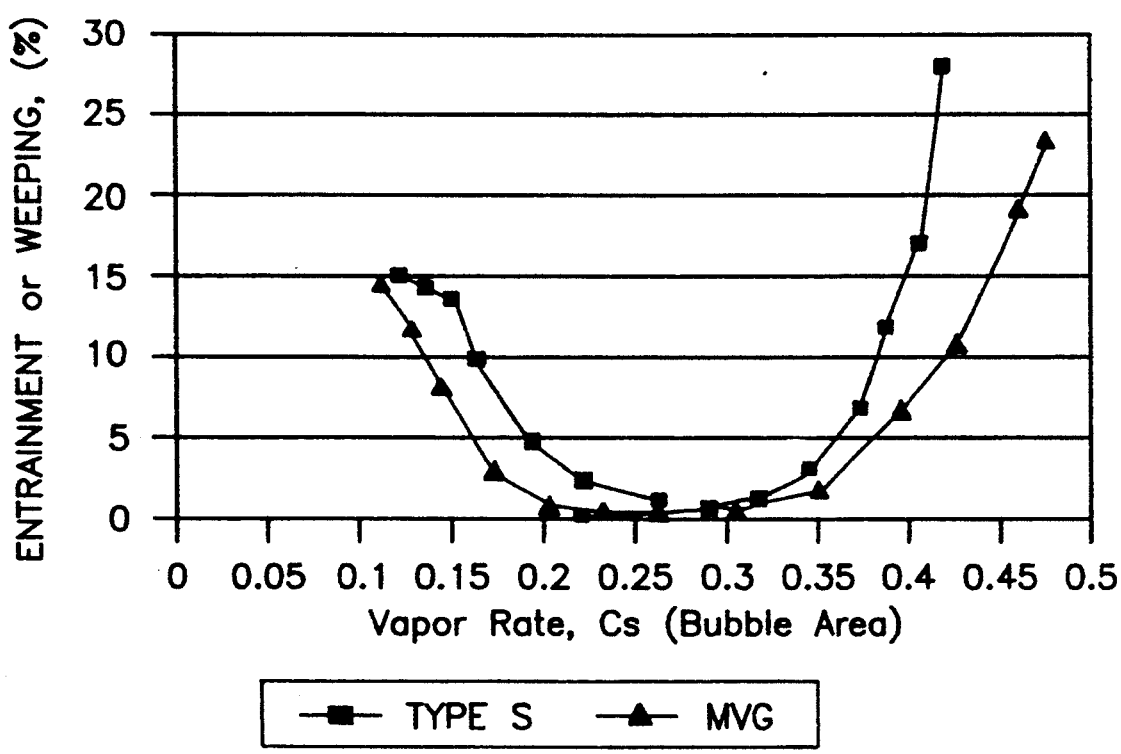
FIG. 8 Tray Comparison 6 GPM/In Weir

HIGH CAPACITY TRAY FOR GAS-LIQUID CONTACT APPARATUS

BACKGROUND OF THE INVENTION

This invention relates to gas-liquid contact apparatus, and it particularly pertains to a novel crossflow tray for use in fractionation towers and other apparatus.

In a typical installation, a number of horizontal trays with openings therein are mounted in a sealed, vertically elongated vessel known in the industry as a column or tower. Liquid is introduced on the upper surface of the uppermost tray. At the downstream end of each tray, there is a weir which leads to a downcomer; and, the downcomer leads to an unperforated upstream area (the "downcomer seal area") on the next lower tray. Gas is introduced into the lower end of the tower. As the liquid flows across the trays, gas ascends through the openings in the trays and into the liquid to create a bubble area where there is intimate and active contact between the gas and liquid. In towers used in high liquid rate systems such as light hydrocarbon distillations and direct contact heat exchange, each tray level may have multiple sets of flow paths including a downcomer, bubbling area and downcomer seal transition area.

Many crossflow trays are simple sieve trays, i.e. decks which have hundreds of circular holes. Some trays have valves associated with the tray openings, and others have fixed deflectors. In an example of the latter, shown and described in U.S. Pat. No. 3,463,464 of Aug. 26, 1969, each tray opening includes a trapezoidal aperture in the plane of the tray deck, and a stationary deflector which overlies and is aligned with the aperture. The deflector and the adjacent deck surface define lateral outlet slots which are oriented to direct vapor which passes up through the aperture in directions which are generally transverse to the flow direction of liquid on the deck.

SUMMARY OF THE INVENTION

The present invention relates to improvements in a type of gas-liquid contact apparatus where a deck tray supports a body of liquid which moves in a generally horizontal flow direction from an upstream location to a downstream location. The deck is provided with apertures which introduce ascending vapor under pressure into the liquid. Each aperture has a longitudinal axis which is parallel to the flow direction, and each aperture is tapered in the plane of the deck from a maximum dimension transverse to the flow direction at its upstream end to a minimum dimension transverse to the flow direction at its downstream end. Deflector members overlie the apertures. Each deflector includes an upstream portion, a central portion, and a downstream portion. Each upstream portion extends above the deck at an upstream end of the associated aperture, and it lies across the entire maximum transverse extent of the aperture so that the entirety of the aperture is shielded from liquid which is moving in the flow direction toward the aperture. Each downstream portion extends above the deck at the downstream end of its aperture, and it lies across the entire transverse extent of the downstream end of the aperture to prevent vapors from impelling liquid in a downstream direction. Each deflector member and the adjacent deck define lateral outlet slots which are oriented to direct vapor which passes up through the aperture in a direction which is generally transverse to the flow direction of liquid on the deck.

In one respect, the invention involves the use of the outlet slots which have an upper edge no longer than about 0.85 inch, a height which is no greater than 0.35 inch, and a lower edge which is no longer than about 2.0 inches.

Another feature of the invention pertains to apertures each of which, in the plane of the tray deck, has a length no greater than 2.0 inches measured along its longitudinal axis, an upstream width no greater than about 1.0 inch, and a downstream width no greater than 0.75 inch. Preferably, the centers of the apertures are spaced apart no more than about 3.0 inches longitudinally of the flow direction, and no more than about 2.0 inches transversely of the flow direction.

Additional features are used in preferred embodiments of the invention. The apertures are arranged in longitudinal rows, and the apertures in adjacent longitudinal rows are staggered so that an aperture in one row has a longitudinal position which is midway between the longitudinal positions of two apertures and an adjacent row. The central portions of the deflectors are supported on the deck by the upstream and downstream deflector portions. The upstream baffle portions and the downstream baffle portions are inclined to form obtuse angles with the deck. Each deflector is integral with the deck and is, in vertical projection, substantially geometrically identical to its respective aperture. The outlet slots are trapezoidal, and burrs are formed around them. Each outlet slot has an area of about 0.3 square inch. This is greater than the area (0.2 square inch) of a one-half inch circular opening in a conventional sieve tray.

BRIEF DESCRIPTION OF THE DRAWINGS

FIG. 1 is a diagrammatic drawing of the general arrangement of crossflow trays in a gas-liquid contact tower.

FIG. 2 is a diagrammatic plan view of the tower of FIG. 1, showing the general proportions of the downcomer area, perforated active bubble area, and unperforated downcomer seal area.

FIG. 3 is a perspective view showing a group of openings in a tray constructed according to the invention.

FIG. 4 is a bottom view of a portion of the tray, showing the aperture shapes, proportions and spacing.

FIG. 5 is a transverse sectional view as seen along the section line 5—5 in FIG. 4.

FIG. 6 is a sectional view taken along the line 6—6 in FIG. 5 to show the curvature and burrs which are formed in the deflector.

FIG. 7 is a graph showing capacity characteristics of fluid contact trays with different openings.

FIG. 8 is a graph showing entrainment and weeping characteristics of contact trays as a function of their capacity indices.

FIG. 9 shows a modification of the invention in which a vertically movable valve is the deflector.

DETAILED DESCRIPTION

FIG. 1 shows, in schematic form, the basic environment of crossflow trays constructed according to the invention. A plurality of horizontal trays 2 are mounted in a vertical tower 4 where they are vertically spaced from each other. Liquid is fed to the uppermost tray by a liquid supply line 6. Downcomer passages 8 lead from the downstream ends of each of the trays to the upstream end of the next lower tray. Openings (not shown in FIG. 1) are formed in the trays so that air or other gas introduced into a lower end of the tower by a gas supply line 10 will ascend through the tower, passing up through the tray openings and into the liquid on the trays 2. The tower has a vapor outlet at its upper end, and a liquid outlet at its lower end.

The proportions of a typical tray are shown in FIG. 2. Each tray has an unperforated upstream segment 12 (the downcomer seal transition) which receives liquid from a downcomer 8 and redirects the liquid flow to an active area 14 ("bubbling area") where the openings are located. As previously mentioned, the reference numeral 8 identifies the downcomer passage. In the downcomer passage, disengagement or separation occurs between the components of the liquid-vapor mixture. The separated vapor component ascends, and the liquid component is delivered to the unperforated downcomer seal transition area at the upstream end of the next tray.

In a typical installation where the tower 4 has a diameter of 48 inches, the length $L_S$ of the unperforated upstream segment 8 is about 8 inches, and the downcomer 8 has a horizontal dimension $L_D$ of about 10 inches. The active area 14 of the deck has a length $L_A$ of about 30 inches. This example is representative of conventional crossflow tray design practice.

The present invention is directed to improvements to a known type of tray which is disclosed in U.S. Pat. No. 3,463,464 of Aug. 26, 1969. As previously mentioned, each opening in a tray of this type includes a trapezoidal aperture in the plane of the tray deck, and a deflector which overlies and is aligned with the aperture. The deflector and the adjacent deck surface define lateral outlet slots which are oriented to direct vapor which passes up through the aperture in directions which are generally transverse to the flow direction of liquid on the deck.

The present invention involves the discovery that superior performance is attainable if trays of this type are constructed to have aperture spacings, aperture sizes, and slot sizes within specific ranges which are different from what was heretofore utilized in the industry.

As shown in FIG. 3, a tray 2 according to the invention has a plurality of apertures 16 with overlying deflectors 18. This drawing shows tray openings positioned in three adjacent longitudinal rows, and the aperture positions are staggered from row-to-row so that an aperture 16 in one row has a longitudinal position which is midway between the longitudinal positions of two longitudinally adjacent apertures 16 in an adjacent row. The centers of the apertures are spaced apart longitudinally of the flow direction by distances $S_L$ which are no more than about 3.0 inches. Transversely of the flow direction, the spacing $S_T$ between the centerlines 20 of adjacent rows is no more than about 2.0 inches.

Each deflector 18 has an upstream portion 18u, a midportion 18m, and a downstream portion 18d. The midportion 18m is generally horizontal, and the upstream and downstream portions 18u, 18d are inclined upwardly and downwardly, respectively, relative to the liquid flow direction.

In plan view, each deflector and its respective aperture are substantially geometrically identical. The dimensions of an aperture 16 formed in the plane of the deck are shown in FIG. 4. Its length L is no greater than 2 inches, its upstream width $W_U$ is no greater than about 1.0 inch, and its downstream width $W_D$ is no greater than 0.75 inch.

FIG. 5 is a side view showing the outlet slot configuration associated with one of the deflectors. The outlet slot 22 is generally trapezoidal. Its lower edge is defined by the upper surface of the tray deck, and its upstream edge, downstream edge, and upper edge are defined by the lower edges of the deflector. Its upper edge has a length $L_U$ no greater than 0.85 inch, a height H which is no greater than 0.35 inch, and a lower edge which has a length $L_L$ no greater than 2.0 inches.

Close inspection of the trays has revealed that the fabrication process produces a transverse upward convexity in the baffle portions 18u and 18d, and burrs around the outlet slots. FIG. 6 shows these burrs 24 in the plane identified by the section line 6—6 in FIG. 5. In addition to enhancing tray efficiency by increasing local turbulence to increase the interfacial contact area between the vapor and liquid at the slot edges, it is likely that these burrs 24 contribute to the improved weeping performance discussed below.

In contrast to trays in the prior art, the trays according to the present invention have smaller center-to-center distances between apertures. The apertures are shorter in length and narrower in width, and the outlet slots are shorter in length and height. The preferred dimensions according to the invention conform with the manufacturing capabilities of computer numerical control ("CNC") presses, which can efficiently provide these commercial manufacturing needs for slot sizes and areas.

The dimensions used in a preferred embodiment of the invention are shown in the row identified as Type MVG in the following table which also shows the corresponding dimensions for the openings in Type L trays and Type S trays which are in the prior art.

| | Center-to-Center Distance | | Aperture Dimensions | | | Slot Dimensions | | |
|---|---|---|---|---|---|---|---|---|
| | Transverse $S_T$ | Longitudinal $S_L$ | Upstream Width $W_U$ | Downstream Width $W_D$ | Length L | Upper Length $L_U$ | Lower Length $L_L$ | Height H |
| Type L | 2.375 | 6.125 | 1.25 | 0.75 | 4.595 | 3.6 | 4.595 | 0.375 |
| Type S | 2.375 | 3.375 | 1.25 | 1.0 | 2.375 | 1.0 | 2.375 | 0.500 |
| Type MVG | 1.5 | 2.5 | .75 | .59 | 1.313 | 0.75 | 1.313 | 0.313 |

It was found by experimentation that the Type L tray resulted in unacceptable entrainment level when liquid rates are low and vapor rates are high. It was known in sieve tray technology that smaller openings produced less entrainment, which led to the design of the Type S trays, the objective of which was to reduce entrainment to a level which would compare favorably to that of standard sieve trays having deflectorless circular openings of 0.5 inch diameter. The larger openings of the Type L and Type S trays are successful in the respect that they reduce the risk of fouling in commercial service.

When the Type S tray was developed, CNC presses were not economically available for this size of tray slot manufacture, so the number of slots in any given area of the tray was also minimized to reduce manufacturing costs. The Type L trays were used extensively because they provided greater slot areas, less risk of fouling and lower manufacturing costs than Type S trays. However, the unsatisfactory entrainment characteristics of Type L trays at low liquid rates have continued to be an impediment to their industrial use.

FIG. 9 shows a tray in which the deck aperture has the same size, shape and orientation as in FIGS. 3–6, but the deflector is a vertically movable valve 28. The valve has outturned feet 28f which limit its upward movement and preset dimples 30 which prevent it from closing completely. When the valve is in its raised and open position, it is a deflector with an upstream portion 28u, a midportion 28m, and a downstream portion 28d. The dimensions of these portions are the same as the dimensions of a corresponding stationary deflector 18, except that the width of the midportion is greater to prevent the valve from falling through the tray aperture when it closes. When the valve 28 is open, it and the adjacent deck define rectangular vapor outlet slots which direct ascending vapor in a direction which is generally transverse to the flow direction of liquid on the deck.

Comparative data showing the capacity and weeping limits of various trays are presented in FIGS. 7 and 8. The Type S tray and the tray according to the present invention had their apertures staggered as shown in FIG. 3 ("triangular pitch") and the Type L tray had a "square pitch" where the apertures in adjacent rows were transversely aligned with each other. As to be expected, the smaller slot sizes according to the present invention resulted in lower entrainment at low liquid rates. Moreover, it was noted that entrainment was lower over the entire liquid rate range of commercial interest.

In the industry, a 10% entrainment level can be used to define good commercial practice, so the capacity of trays according to the present invention, as shown in FIG. 7, is extremely significant as its capacity advantage at constant liquid rate ranges from around 7% at low liquid rates to around 9% at moderate liquid rates.

When it became known that the tray had such favorable entrainment and capacity properties, it was expected that there would be sacrifices in other performance characteristics. Surprisingly, however, the tray constructed according to the invention resulted in better weeping performance. This attribute is shown in the graph of FIG. 8 where it will be seen that, at the 10% entrainment-weeping level, there was an increased turndown potential of about 32%. The ascending vapor rate curves are in the range where entrainment occurs, and the descending vapor rate curves are in the weeping range. It is seen that the tray constructed according to the invention shows a lower weeping rate (left) and a lower entrainment rate (right).

The improved weeping characteristics of the Type MVG tray were also found to result in a more uniform aeration over the bubbling area in a manner which is similar to aeration achieved by sophisticated valve trays designed by the present inventor.

From the foregoing, it will be seen that this invention provides a fluid contact tray and apparatus which has particular performance and cost advantages. Persons skilled in the art will recognize that these advantages can be realized from trays which differ from the embodiments described above. Therefore, it is emphasized that the invention is not limited to the disclosed embodiments and does include variations and modifications which fall within the spirit of the following claims.

I claim:

1. A fluid contact tray for supporting a body of liquid moving thereacross in a generally horizontal flow direction from an upstream location to a downstream location, comprising, a deck having a group of apertures for introducing ascending vapors under pressure into said liquid, said apertures having longitudinal axes which are parallel to said flow direction, each of said apertures being tapered in the plane of the deck from a maximum dimension transverse to said flow direction at its upstream end to a minimum dimension transverse to said flow direction at its downstream end;

a plurality of stationary deflector members each overlying and aligned with a respective one of said apertures, each deflector member including an upstream portion, a central portion, and a downstream portion; said central portion being connected to said upstream and downstream portions;

each said upstream portion extending above the deck at an upstream end of one of said apertures and lying across the entire maximum transverse extent of its respective aperture so that the entirety of the aperture is shielded from liquid which is moving in the flow direction toward the aperture, each said downstream portion extending above the deck at the downstream end of one of said apertures and lying across the entire transverse extent of the downstream end of the respective aperture to prevent vapors from impelling liquid in a downstream direction, each said deflector member and said deck defining lateral outlet slots which are oriented to direct vapor which passes up through the aperture in a direction which is generally transverse to the flow direction of liquid on the deck, said tray having burrs formed around said outlet slots, said outlet slots each having an upper edge which is no longer than about 0.85 inch, a height which is no greater than 0.35 inch, and a lower edge which is no longer than about 1.5 inches, said apertures having centers which are spaced apart no more than about 3.0 inches longitudinally of said flow direction and no more than about 2.0 inches transversely of the flow direction.

2. Apparatus according to claim 1 in which said upstream baffle portions and said downstream baffle portions are inclined to form obtuse angles with said deck.

3. Apparatus according to claim 1 in which each of said deflector members is integral with said deck and is, in vertical projection, substantially geometrically identical to its respective aperture.

4. Apparatus according to claim 1 wherein each said outlet slot has an area of about 0.3 square inches.

5. Apparatus according to claim 1 wherein said apertures are arranged in longitudinal rows, said apertures in adjacent longitudinal rows being staggered so that an aperture in one row has a longitudinal position which is midway between the longitudinal positions of two apertures in an adjacent row.

6. A plurality of fluid contact trays according to claim 1 in combination with a tower, said trays being mounted in said tower and vertically spaced from each other; and downcomer conduit means leading from downstream locations of said trays to upstream locations of trays therebelow.

7. Apparatus according to claim 1 wherein each of said apertures has a length measured along its longitudinal axis which is no greater than 2 inches, an upstream width which is no greater than about 1.0 inch, and a downstream width which is no greater than 0.75 inch.

8. A fluid contact tray for supporting a body of liquid moving thereacross in a generally horizontal flow direction from an upstream location to a downstream location, comprising, a deck provided with a group of apertures for introducing ascending vapors under pressure into said liquid, said apertures having longitudinal axes which are parallel to said flow direction, each of said apertures being tapered in the plane of the deck from a maximum dimension transverse to said flow direction at its upstream end to a minimum dimension transverse to said flow direction at its downstream end, each of said apertures having a length measured along its longitudinal axis which is no greater than 1.5 inches, an upstream width which is no greater than about 1.0 inch, and a downstream width which is no greater than 0.75 inch;

said apertures having centers which are spaced apart no more than about 3.0 inches longitudinally of said flow direction and no more than about 2.0 inches transversely of the flow direction;

a plurality of stationary deflector members each overlying and aligned with a respective one of said apertures, each deflector member including an upstream portion, a central portion, and a downstream portion; said central portion being connected to the deck by said upstream and downstream portions;

each said upstream portion extending above the deck at an upstream end of one of said apertures and lying across the entire maximum transverse extent of its respective aperture so that the entirety of the aperture is shielded from liquid which is moving in the flow direction toward the aperture, each said downstream portion extending above the deck at the downstream end of one of said apertures and lying across the entire transverse extent of the downstream end of the respective aperture to prevent vapors from impelling liquid in a downstream direction, each said deflector member and said deck defining lateral outlet slots which are oriented to direct vapor which passes up through the aperture in a direction which is generally transverse to the flow direction of liquid on the deck, said tray having burrs formed around said outlet slots.

9. Apparatus according to claim 8 in which said upstream baffle portions and said downstream baffle portions are inclined to form obtuse angles with said deck.

10. Apparatus according to claim 8 in which each of said deflector members is integral with said deck and is, in vertical projection, substantially geometrically identical to its respective aperture.

11. Apparatus according to claim 8 wherein each said outlet slot has an area of about 0.3 square inches.

12. Apparatus according to claim 8 wherein said apertures are arranged in longitudinal rows, said apertures in adjacent longitudinal rows being staggered so that an apertures in one row has a longitudinal position which is midway between the longitudinal positions of two apertures in an adjacent row.

13. A plurality of fluid contact trays according to claim 8 in combination with a tower, said trays being mounted in said tower and vertically spaced from each other; and downcomer conduit means leading from downstream locations of said trays to upstream locations of trays therebelow.

* * * * *